(12) United States Patent
Leijon

(10) Patent No.: US 11,025,489 B2
(45) Date of Patent: Jun. 1, 2021

(54) AUTOMATED DISCOVERY OF MANUAL CONFIGURATION CHANGES

(71) Applicant: Cisco Technology, Inc., San Jose, CA (US)

(72) Inventor: Viktor M. E. Leijon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 16/421,332

(22) Filed: May 23, 2019

(65) Prior Publication Data

US 2020/0374192 A1    Nov. 26, 2020

(51) Int. Cl.
*H04L 12/24*    (2006.01)
*G06F 9/445*    (2018.01)

(52) U.S. Cl.
CPC ...... *H04L 41/0816* (2013.01); *G06F 9/44505* (2013.01); *H04L 41/0806* (2013.01); *H04L 41/0853* (2013.01); *H04L 41/0883* (2013.01)

(58) Field of Classification Search
CPC ............. H04L 41/0816; H04L 41/0806; H04L 41/0853; H04L 41/0883; H04L 12/4641; H04L 41/0213; H04L 41/08; H04L 41/0803; H04L 41/0886; H04L 41/0893; H04L 41/12; H04L 41/145; H04L 41/22; H04L 43/08; H04L 45/64; H04L 63/20; H04L 67/10; G06F 9/44505; G06F 11/079; G06F 11/26; G06F 16/212; G06F 8/20; G06F 9/45558; G06F 9/5072; G06N 20/00; G06N 5/022
See application file for complete search history.

(56) References Cited

U.S. PATENT DOCUMENTS

| 7,457,853 B1 * | 11/2008 | Chari | G06F 9/44505 |
| | | | 709/217 |
| 7,747,633 B2 * | 6/2010 | Kadiyska | G06F 40/14 |
| | | | 707/755 |
| 8,589,557 B1 * | 11/2013 | Labat | G06F 9/5061 |
| | | | 709/226 |

(Continued)

OTHER PUBLICATIONS

Katiyar, Rohit & Pawar, Prakash & Gupta, Abhay & Kataoka, Kotaro. (2015). Auto-Configuration of SDN Switches in SDN/Non-SDN Hybrid Network. 48-53. 10.1145/2837030.2837037. (Year: 2015).*

(Continued)

*Primary Examiner* — Christopher Biagini
(74) *Attorney, Agent, or Firm* — Patterson + Sheridan, LLP

(57) ABSTRACT

Techniques for automated analysis and classification of network configurations are provided. Resource provisioning code used to provision resources in a network is received, and a set of constraints is generated based on the resource provisioning code, where the set of constraints define valid network configurations. A configuration tree for the network is received, and a set of candidates is generated for the network based at least in part on the configuration tree. Upon determining that a first candidate of the set of candidates does not fail any constraint in the set of constraints, the first candidate is recorded as a manual intent. The manual intent is integrated into an automated configuration system for the network.

20 Claims, 7 Drawing Sheets

(56) References Cited

U.S. PATENT DOCUMENTS

| | | | |
|---|---|---|---|
| 8,706,879 | B2 | 4/2014 | Sparks |
| 9,094,299 | B1* | 7/2015 | Rao .................. H04L 41/0803 |
| 10,237,176 | B2 | 3/2019 | Mutnuru et al. |
| 2007/0113186 | A1* | 5/2007 | Coles .................. G06F 9/4411 |
| | | | 715/735 |
| 2014/0344391 | A1 | 11/2014 | Varney et al. |
| 2015/0319043 | A1* | 11/2015 | Dibirdi .................. H04L 41/30 |
| | | | 370/254 |
| 2017/0006082 | A1* | 1/2017 | Shishodia ............. H04L 43/045 |
| 2017/0264491 | A1 | 9/2017 | Deruijter |
| 2017/0302532 | A1 | 10/2017 | Maes |
| 2018/0041393 | A1* | 2/2018 | Munihanumaiah .......................... |
| | | | H04L 41/0866 |
| 2018/0351806 | A1 | 12/2018 | Mohanram et al. |
| 2018/0365272 | A1* | 12/2018 | Sastry ................ G06F 16/2246 |
| 2019/0014153 | A1 | 1/2019 | Lang et al. |
| 2019/0324743 | A1* | 10/2019 | Sajadi ................ G06F 9/44505 |

OTHER PUBLICATIONS

Sumit Gulwani and Prateek Jain, Programming by Examples: PL meets ML, APLAS 2017, 22 pages.

Benjamin C. Pierce, "The Weird World of Bi-Directional Programming," Microsoft Research, Cambridge, 2006, 140 pages.

Constraint.org, "What is Constraint Programming," 6 pages [Accessed Online May 23, 2019] http://constraint.org/en/intro.html.

"Abstract Interperation" 12 pages, [Accessed Online May 23, 2019] http://pages.cs.wisc.edu/~horwitz/CS704-NOTES/10.Abstract-Interpretation.html.

Wikipedia, "Service Discovery," 2 pages, [Accessed Online May 23, 2019] https://en.wikipedia.org/wiki/Service_discovery.

"Discovery and Reconciliation," 2 pages, [Accessed Online May 23, 2019] https://www.ericsson.com/en/portfolio/digital-services/automated-network-operations/orch . . . .

Sahana M R et al."The Overview of Discovery and Reconciliation of LTE Network," International Research Journal of Engineering and Technology (IRJET) , vol. 4, Issue 3, Mar. 2017, 3 pages.

PCT Notification of Transmittal of the International Search Report and the Written Opinion of the International Searching Authority, or the Declaration for Application No. PCT/US2020/034059 dated May 21, 2020.

Campanella A: "Intent Based Network Operations", 2019 Optical Fiber Communications Conference and Exhibition (OFC), OSA, Mar. 3, 2019 (Mar 3, 2019), pp. 1-3 [Abstract Only].

Hewlett-Packard Enterprise: "ZSM005 Intent Based Means", ETSI Draft; ZSM(18)000558, European Telecommunications Standards Institute (ETSI), 650, Route Des Lucioles; F-06921 Sophia-Antipolis ; France vol. ISG ZSM Zero touch network and Service Management, Nov. 26, 2018 (Nov. 26, 2018), pp. 1-12.

Sivakumar M Chandramouli Cisco Systems K et al: "Concepts of Network Intent; draft-moulchan-nmrg-ietwork-intent-concept s-00. txt", Concepts of Network Intent; Draft-Moulchan-NMRG-Network-Intent-Concept S-00.TXT; Internet-Draft: Internet Research Task Force, Internet Engineering Task Force, IETF; Standardworkingdraft, Internet Society (ISOC) 4, Rue Des Falaises Ch- 1205 Geneva, SW, Oct. 29, 2017 (Oct. 29, 2017), pp. 1-10.

Douglas Comer et al: "OSDF: An Intent-based Software Defined Network Programming Framework", Arxiv. Org, Cornell University Library, 201 OLIN Library Cornell University Ithaca, NY 14853, Jul. 6, 2018 [Abstract Only].

Chaithan Prakash et al: "PGA", Special Interest Group on Data Communication, ACM, 2 Penn Plaza, Suite 701 New York NY 10121-0701 USA, Aug. 17, 2015 (Aug. 17, 2015), pp. 29-42.

\* cited by examiner

300

110
```
device {device}
    flagA 1
    interface {interface}
        description "Interface for {device}"
```

215
```
device [list]
    flagA [int]
    interface [list]
        description [string]
```

115
```
device X
    flagA 2
    interface If0
        description "Interface for X"

device Y
    flagA 1
    interface If0
        description "Interface for X"

device Z
    flagA 1
    interface If0
        description "Interface for Z"
    interface If1
        description "Interface for W"
```

FIG. 3

AUTOMATED DISCOVERY OF MANUAL CONFIGURATION CHANGES

TECHNICAL FIELD

Embodiments presented in this disclosure generally relate to software-defined networking. More specifically, embodiments disclosed herein relate to automated discovery of manually configured intents in network configurations.

BACKGROUND

Typical computer networks are subject to frequent configuration changes in daily use. These changes can include adding or removing physical or virtual devices (such as gateways, routers, switches, and the like), modifying interfaces, and the like. In many existing networks, and particularly in software-defined networking (SDN), this process is performed manually using resource provisioning programs. For example, administrators can provide input to a provisioning program, which carries out the actual configuration changes required to satisfy the user's intent. In some systems, networks use intent-based configurations, where administrators specify the desired outcome (e.g., "what" the network should do) while the provisioning programs implement that intent (e.g., determine "how" to achieve the outcome). Network configuration is also becoming increasingly automated, and resource provisioning programs that require manual interaction are being replaced with automated systems. In order to operate as intended, these automated systems must be able to identify and understand the manually-configured intents and configurations that exist in the network. Typically, this requires users to manually specify the previous configuration changes. This process is expensive, requires significant time investment, and is error prone, especially as network administrators may no longer recall the changes (or may no longer be available).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 illustrates an example service provisioning program, provisioning program schema, and configuration tree, according to one embodiment disclosed herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
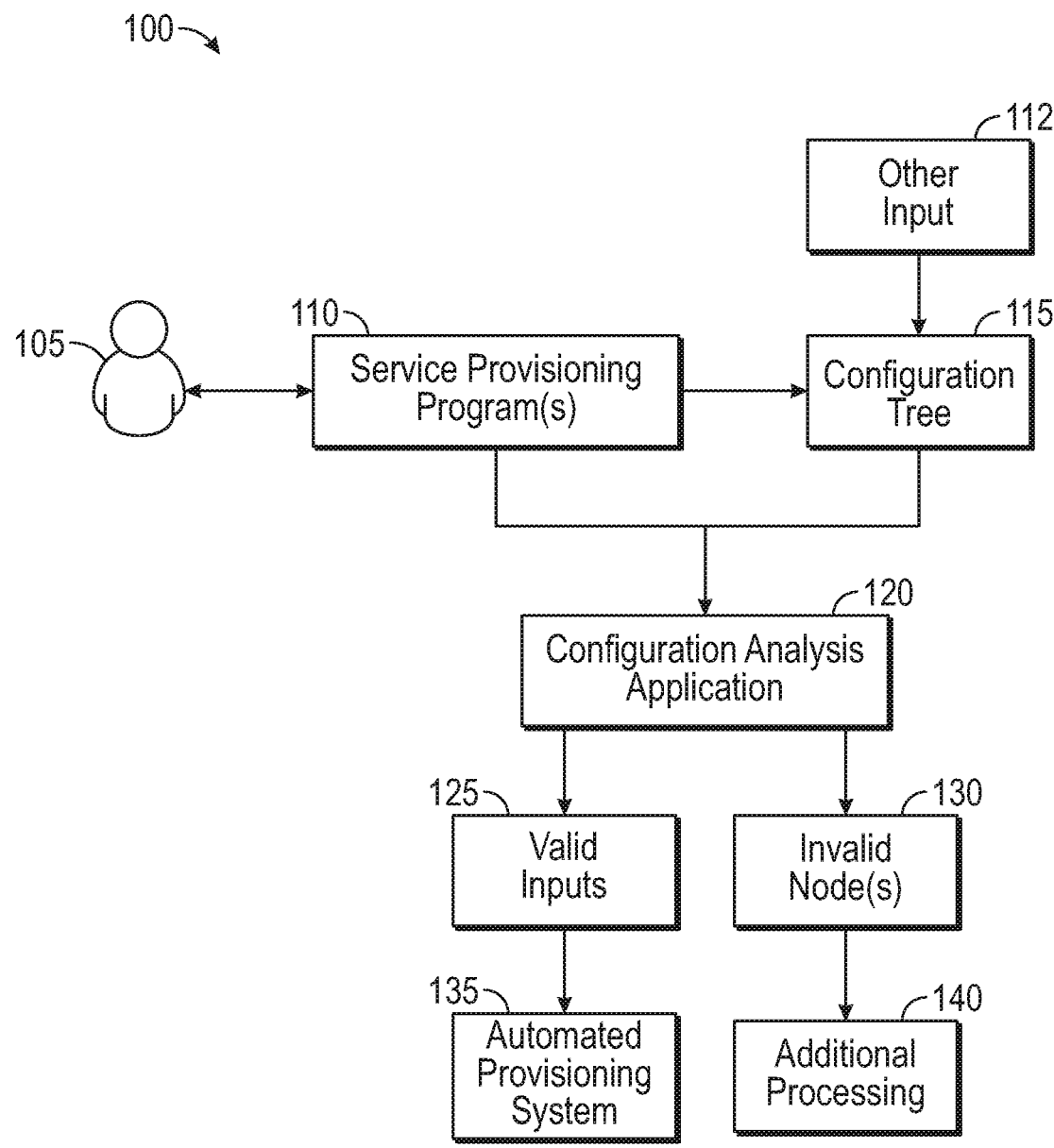
FIG. 1 illustrates a workflow for identification of manually configured intents that can be ingested into an automated resource provisioning system.

According to one embodiment presented in this disclosure, a method is provided. The method includes receiving resource provisioning code used to provision resources in a network, and generating a set of constraints based on the resource provisioning code, wherein the set of constraints define valid network configurations. The method further includes receiving a configuration tree for the network, and generating a set of candidates for the network based at least in part on the configuration tree. Additionally, upon determining, by operation of one or more computer processors, that a first candidate of the set of candidates does not fail any constraint in the set of constraints, the method includes recording the first candidate as a first manual intent. Finally, the method includes integrating the first manual intent into an automated configuration system for the network.

According to a second embodiment presented in this disclosure, a non-transitory computer-readable storage medium is provided. The computer-readable storage medium has computer-readable program code embodied therewith, the computer-readable program code executable by one or more computer processors to perform an operation. The operation includes receiving resource provisioning code used to provision resources in a network, and generating a set of constraints based on the resource provisioning code, wherein the set of constraints define valid network configurations. The operation further includes receiving a configuration tree for the network, and generating a set of candidates for the network based at least in part on the configuration tree. Additionally, upon determining that a first candidate of the set of candidates does not fail any constraint in the set of constraints, the operation includes recording the first candidate as a first manual intent. Finally, the operation includes integrating the first manual intent into an automated configuration system for the network.

According to a third embodiment presented in this disclosure, a system is provided. The system includes one or more computer processors, and a memory containing a program which when executed by the one or more computer processors performs an operation. The operation includes receiving resource provisioning code used to provision resources in a network, and generating a set of constraints based on the resource provisioning code, wherein the set of constraints define valid network configurations. The operation further includes receiving a configuration tree for the network, and generating a set of candidates for the network based at least in part on the configuration tree. Additionally, upon determining that a first candidate of the set of candidates does not fail any constraint in the set of constraints, the operation includes recording the first candidate as a first manual intent. Finally, the operation includes integrating the first manual intent into an automated configuration system for the network.

Example Embodiments

Embodiments of the present disclosure enable identification of manual configuration changes and intent, in a way that allows automated configuration systems to take ownership of these configurations. In an embodiment, if a configuration change was implemented consistently with a resource provisioning system or program, this change can be identified as a "valid" configuration that should be ingested and implemented/controlled by the automation system. In contrast, if the configuration was implemented without use of the established provisioning systems (e.g., as a one-off tweak), some embodiments of the present disclosure can flag the change as suspect, unverified, invalid, or otherwise requiring additional review. That is, because the change was not made using the established program(s) or process(es), the automated system cannot ingest and take ownership of it, because there is no understanding of the inputs used or the desired intent. Additionally, because the change was made without the defined provisioning software, the changes may violate norms or preferences that define how the network should be configured.

In one embodiment, the system described herein applies constraint solving to configuration trees to effectively execute the provisioning code in reverse, in order to identify the inputs originally applied by administrators to arrive at the current configuration. Although service provisioning code (and indeed, most software) is not reversible in the general case, given typical network configurations and software, this problem is highly tractable and embodiments of the present disclosure can reliably handle realistic use cases. In some embodiments of the present disclosure, the configurations of computer networks are modeled as trees, such as using eXtensible Markup Language (XML). Additionally, in embodiments of the present disclosure, service provisioning and/or intent-based networking is implemented as a Domain-Specific Language (DSL) on these trees. In an embodiment, the configuration trees are recursively matched against templates (e.g., constraints), such that if the matching is to fail at any point in the tree, the matching reliably will fail at the first (e.g., highest) level in the tree where the constraint(s) are violated. That is, the system can analyze each node of the configuration tree (beginning at the highest level of the tree) separately, and need not analyze the entire tree simultaneously. If the matching will fail at a given node, the system can potentially identify this failure at a relatively higher level of the tree. Further, in some embodiments, if matching fails at a node, the system need not analyze any children of the failing node, which further improves efficiency and resource usage of the currently described system.

In an embodiment, a configuration tree can be described by a schema, where each schema node in the schema has zero or more instances in the configuration tree, and each configuration node in the configuration tree corresponds to at least one node in the schema. In an embodiment, the schema describes the structure of the provisioning software (e.g., hierarchy, inheritance, data types, and the like). For example, a schema tree may have a "device" node, with child nodes corresponding to flags, interfaces, descriptions, and the like. In an embodiment, the service provisioning code is a schema-aware program P such that for a given schema node S, the program P can be specialized as $P_S$ such that given input I, $P_S(I)$ yields N, where N is a valid node in the configuration tree for the network. In some embodiments of the present disclosure, the algorithm is applied recursively to each node in the schema, the specialized program, and/or the corresponding node(s) in the configuration, to identify potential inputs representing previously-configured intents. In some embodiments of the present disclosure, the network is configured using intent-based systems. In such an embodiment, administrators can define the desired outcomes (e.g., what they would like the network to do), and the resource provisioning programs can implement those intents by determining precisely how to achieve the desired goal.

In some embodiments, candidates are created based in part on the configuration tree, where each candidate is a set of potential inputs to the service provisioning program. Further, constraints are generated based in part on the service provisioning program, where each constraint represents a limitation or requirement that the input/configuration should comply with, as defined in the provisioning program. If a candidate is incompatible with a constraint, it is eliminated from further consideration. In one embodiment, these eliminated candidates represent configuration changes that cannot be made using the provisioning program. That is, if such an invalid candidate is found in the actual configuration, it must have been made informally (e.g., without use of the provisioning system), rendering the nature of the configuration uncertain and unaccounted for. In one embodiment, these failed candidates are referred to as "invalid" candidates. Although referred to as "invalid," these candidates may, of course, represent desired configuration nodes in the network. These candidates or nodes are referred to as "invalid" only to indicate that they were not created using the defined provisioning software, and thus cannot be verified, explained, or ingested into an automated system.

In an embodiment, if a candidate is compatible with the constraints, it is a valid input for the program, meaning that it can be provided to the provisioning system to generate an output configuration that actually exists in the network. In embodiments, these valid candidates are identified as manually configured intents that were carried out "properly" (e.g., using the provisioning software). These configuration changes can then be ingested into the automated provisioning system, and implemented in the network as desired. Further, in some embodiments, if a candidate ambiguously satisfies a constraint, it is split to generate new candidates. For example, if there are two (or more) values (e.g., sets of inputs) that cause the candidate to satisfy the constraint (and yield configurations that actually exist in the network), two (or more) candidates are generated to reflect these potential inputs.

FIG. 1 illustrates a workflow 100 for identification of manually configured intents that can be ingested into an automated resource provisioning system. In the illustrated workflow 100, Administrators 105 interact with one or more Service Provisioning Program(s) 110, in order to generate configurations for one or more networks. As illustrated, this configuration can be represented as a Configuration Tree 115. Additionally, in the illustrated embodiment, the configuration may also be modified externally (e.g., manually and without use of the defined Service Provisioning Programs 110), as indicated by the Other Input 112. In some embodiments, it is preferable to use the Service Provisioning Program(s) 110 to make configuration changes, as these programs typically ensure the configuration is consistent and adheres to preferred guidelines, definitions, and the like. However, as is common in existing networks, administrators may also directly modify the configuration, such as to correct a one-off issue that is unique to a particular context. Although this manual configuration is not preferred, it is nevertheless common.

In embodiments of the present disclosure, the Configuration Analysis Application 120 analyzes the Configuration Tree 115 to classify each portion of the configuration as either "valid" or "legal," indicating that it was implemented using the provisioning software, or "invalid" or "illegal," indicating it was implemented externally to these programs. In the illustrated embodiment, the Configuration Analysis Application 120 receives the code for the Service Provisioning Program(s) 110, as well as the Configuration Tree 115. In some embodiments, the Configuration Analysis Application 120 also receives the schema used to describe the configuration. In one embodiment, if the schema is not available (or does not exist), the Configuration Analysis Application 120 analyzes the Service Provisioning Program(s) 110 and/or the Configuration Tree 115 to infer and generate the corresponding schema.

In the illustrated embodiment, based on this input, the Configuration Analysis Application 120 segregates the Valid Inputs 125 from the Invalid Node(s) 130. In one embodiment, Valid Inputs 125 correspond to candidates that satisfied each of the generated constraints such that, given the input, the Service Provisioning Program(s) 110 will generate one or more nodes that actually exist in the Configuration Tree 115. Similarly, in an embodiment, Invalid Nodes 130 correspond to portions of the Configuration Tree 115 that cannot have been generated using the Service Provisioning Program(s) 110, and thus were created or modified using other means. As illustrated embodiment, in some embodiments, the Valid Inputs 125 are ingested into the Automated Provisioning System 135, such that the underlying configurations can be implemented automatically. In one embodiment, the Automated Provisioning System 135 allows the network configuration to be automated while co-existing with human administrators. For example, the Automated Provisioning System 135 can be deployed to learn previously-configured intents, and can therefore recreate these intents should the need arise, without requiring administrators to manually configure them again.

In contrast, the Invalid Nodes 130 are flagged for Additional Processing 140. In various embodiments, Additional Processing 140 may include, for example, review by a human in order to determine the underlying intent, or to make a decision regarding how the configuration should be implemented in the Automated Provisioning System 135. In other embodiments, the Additional Processing 140 may include one or more other algorithms, use of heuristics, and the like. In existing systems, all configuration changes must undergo this tedious and error-prone process. However, embodiments of the present disclosure enable the "valid" configurations to be automatically identified and implemented.

Figure 2:
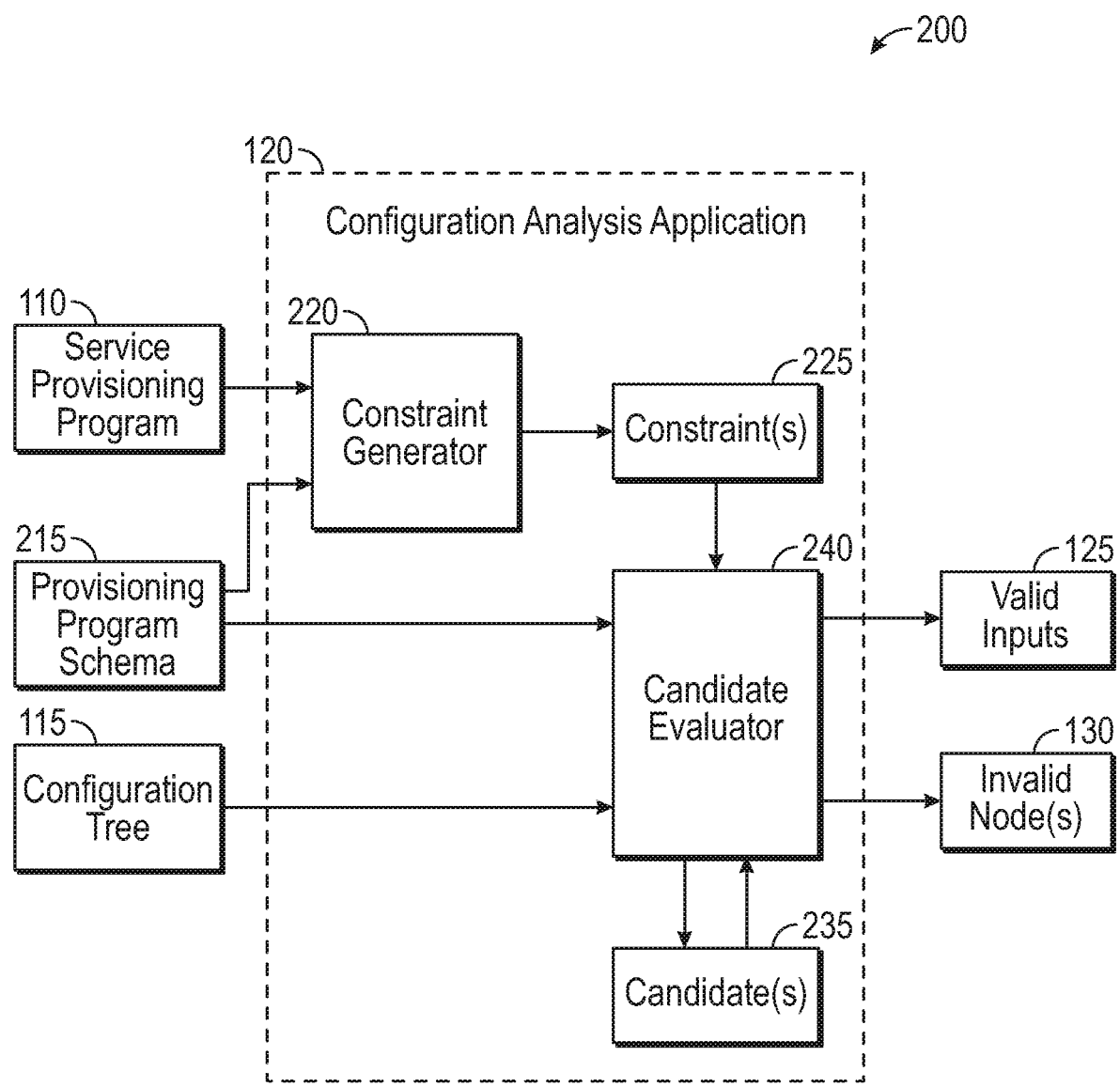
FIG. 2 illustrates a workflow showing the operations of an automated configuration analysis application in identifying manual changes in a network configuration, according to one embodiment disclosed herein.

FIG. 2 illustrates a workflow 200 showing the operations of an automated Configuration Analysis Application 120 in identifying manual changes in a network configuration, according to one embodiment disclosed herein. In the illustrated embodiment, the Service Provisioning Program 110 and Provisioning Program Schema 215 are provided as inputs to a Constraint Generator 220, which is included in the Configuration Analysis Application 120. In an embodiment, the Constraint Generator 220 identifies each schema node in the Provisioning Program Schema 215, and identifies the corresponding portion(s) of the Service Provisioning Program 110 that relate to this schema node. In this way, the Constraint Generator 220 can generate a set of one or more Constraints 225 for each schema node. In an embodiment, each Constraint 225 generally indicates a restriction or limitation on valid configuration nodes (e.g., inputs that yield a valid configuration node as output). Nodes in the Configuration Tree 115 can then be analyzed in view of these Constraints 225 to identify valid and invalid nodes.

As an example, suppose a "flag" node exists in the Provisioning Program Schema 215, and the Service Provisioning Program 110 includes a line of code that sets this flag to a constant value. In such an embodiment, the Constraint Generator 220 can generate a "constant" constraint, indicating that the only valid value for this "flag" node in the Configuration Tree 115 is that identified constant value. Stated differently, for every instance of the "flag" node in the Configuration Tree 115, the value must be equal to the constant specified in the Service Provisioning Program 110. If a given node differs, that node was not generated using the Service Provisioning Program 110 (or it was subsequently modified). Instead, it was manually created or modified by a user, without use of the defined programs. Because of this, the automated system may be unable to absorb or ingest that particular node or configuration. In embodiments, the failed node(s) may be reviewed subsequently by a system administrator, or using one or more heuristics or other algorithms.

In the illustrated embodiment, the Provisioning Program Schema 215 is also provided to a Candidate Evaluator 240, along with the Configuration Tree 115. In the illustrated embodiment, the Candidate Evaluator 240 iteratively and recursively applies the generated Constraints 225 for each schema node to the Configuration Tree 115 to generate (and modify, narrow, or eliminate) Candidates 235. For example, continuing the above example, if the schema node being analyzed is a "flag," the Candidate Evaluator 240 identifies all instances of this particular "flag" node in the Configuration Tree 115. In the illustrated embodiment, the Configuration Analysis Application 120 can generate a set of one or more Candidates 235, based on the values observed in the Configuration Tree 115. For example, if the Configuration Tree 115 includes three different values for the "flag" node, the Candidate Evaluator 240 can generate three separate Candidates 235, one for each discovered value.

As illustrated, these Candidates 235 are recursively and iteratively fed back into the Candidate Evaluator 240 to continue applying the Constraints 225 to the Candidates 235. In an embodiment, as discussed above, if a given Candidate 235 fails at least one Constraint 225, it is eliminated from further consideration and is classified as an Invalid Node 130. In some embodiments, the rest of the branch (e.g., all child nodes of the Invalid Node 130) in the Configuration Tree 115 are similarly classified as invalid. For example, if an "interface" node is found invalid, all child nodes (such as a "description" node for the interface) are also invalid. In one embodiment, if a given Candidate 235 unambiguously satisfies all applicable Constraints 225, it is classified as a Valid Input 125, indicating that the corresponding configuration nodes covered by the Candidate 235 are "valid" nodes in the tree. Further, if a given Candidate 235 ambiguously satisfies a Constraint 225 (e.g., because there are two or more ways the candidate could satisfy the constraint), it is split into multiple Candidates 235 for further analysis.

In some embodiments, Candidates 235 are modified during the process, such that each Candidate 235 can potentially accumulate information each time it passes through the evaluator. That is, in an embodiment, as additional Constraints 225 are applied, the Candidate 235 can be narrowed or constrained based on the requirement(s) imposed by the Constraint 225 and/or the Configuration Tree 115. For example, if a particular Constraint 225, together with the Configuration Tree 115, requires a specific value, the Candidate(s) 235 can be modified to include this value. In one embodiment, the Candidate Evaluator 240 analyzes all schema nodes in the Provisioning Program Schema 215, and each Candidate 235 is then analyzed. In some embodiments, rather than analyzing the entire tree simultaneously, the Configuration Analysis Application 120 iteratively and recursively analyzes each schema node in turn. In an embodiment, if a configuration node is found invalid, the Configuration Analysis Application 120 ceases consideration of the corresponding branch of the Configuration Tree 115. For example, if the highest-level node in the Provisioning Program Schema 215 is a "device" node, the Configuration Analysis Application 120 first generates candidates and analyzes each identified device node in the Configuration Tree 115. If any are found invalid at this level of the schema, they are discarded and their child nodes (e.g., interfaces) are ignored.

In contrast, for each device node found valid in the configuration (e.g., if the corresponding candidate covering the device node satisfies the relevant constraints), the Configuration Analysis Application 120 can proceed to the next level down the Provisioning Program Schema 215 (e.g., an "interface" node) and similarly generate candidates for analysis. In embodiments, this operation can be conducted using a breadth-first search and/or a depth-first search, depending on the particular implementation. For example, in a depth-first system, the Configuration Analysis Application 120 may analyze each "device" node entirely (iterating through all of its child nodes, the child nodes of those child nodes, and so on) until the "device" node is found to be valid or invalid (e.g., a Valid Input 125 or valid node, or an Invalid Node 130 or invalid input). The Configuration Analysis Application 120 then iterates through each such device node. In contrast, using a breadth-first search, the Configuration Analysis Application 120 analyzes each "device" node, followed by child nodes at a first level of the hierarchy for each device node, and so on, iterating through progressively deeper levels of the tree.

FIG. 3 illustrates an example Service Provisioning Program 110, Provisioning Program Schema 215, and Configuration Tree 115, according to one embodiment disclosed herein. In the illustrated embodiment, the Service Provisioning Program 110, Provisioning Program Schema 215, and Configuration Tree 115 are used as simple examples to aid understanding. Of course, in practice, the Service Provisioning Program 110, Provisioning Program Schema 215, and Configuration Tree 115 are likely to be significantly more complex. As illustrated, the example Service Provisioning Program 110 receives two inputs, "device" and "interface," and generates a configuration for a device (e.g., in a SDN).

As illustrated, the Provisioning Program Schema 215 defines the structure of the Service Provisioning Program 110 and Configuration Tree 115, and the nodes that are possible in the ultimate configuration. Specifically, there can be zero or more "device" nodes, each of which can have zero or more child nodes. As illustrated, each "device" node should specify a "device," which is provided as an input to the program. Further, any child nodes of each device node can either be a "FlagA" node, or an "interface" node. In one embodiment, the "FlagA" node has an integer value, and does not have children. Similarly, as illustrated, each "interface" node includes a list of interface(s), and each such node in the Configuration Tree 115 can have zero or more child nodes, where each child node is an instance of a "description" node. The description node includes a string. In some embodiments, the Configuration Tree 115 cannot include nodes that are not defined in the Provisioning Program Schema 215. In another embodiment, if a node is identified in the Configuration Tree 115 without a corresponding node in the Provisioning Program Schema 215, the system can determine that the identified node is "invalid," in that it could not have been produced using the Service Provisioning Program 110.

In some embodiments, if the Provisioning Program Schema 215 is not available, the Configuration Analysis Application 120 generates one based on the Service Provisioning Program 110 and/or the Configuration Tree 115. For example, in one embodiment, the Configuration Analysis Application 120 identifies all nodes in the Configuration Tree 115, groups nodes with a shared structure (e.g., "device" nodes, "interface" nodes, and the like) and generates the schema. In another embodiment, the Configuration Analysis Application 120 reviews the Service Provisioning Program 110 to identify output that it can create (e.g., nodes in the tree).

In the illustrated embodiment, the Service Provisioning Program 110 and Provisioning Program Schema 215 can be used to generate constraints on the valid inputs for the network configuration. In some embodiments, the constraints are generated on a per-schema node basis. For example, for the device schema node, the Constraint Generator 220 can identify the corresponding section(s) of the Service Provisioning Program 110. That is, the Constraint Generator 220 identifies all portions of the Service Provisioning Program 110 that create or modify "device" nodes. In the illustrated embodiment, the only applicable constraint to the "device" node (as defined in the Service Provisioning Program 110) is an equality constraint specifying that the value must be a list of one or more "devices," which are input by the user. That is, the equality constraint forces the existing candidates to take the value(s) found in the Configuration Tree 115. Similarly, for the "interface" schema node, the Constraint Generator 220 can refer to the Service Provisioning Program 110 to generate an equality constraint stating that the node, if present, must include a list of one or more "interfaces" supplied by the user.

Turning to the "flagA" schema node, in an embodiment, the Constraint Generator 220 can determine that the only valid value is a constant "1," based on the Service Provisioning Program 110. Further, the "description" node, if present, should include a string that states "Interface for" followed by the same "device" that was used in the corresponding device node for the interface (e.g., the parent). In this manner, the Constraint Generator 220 can generate a series of constraints that are applied to each node in the Configuration Tree 115 and each candidate, in order to determine whether the node is a valid output of the Service Provisioning Program 110.

As illustrated, the Configuration Tree 115 has three device nodes. In an embodiment, the Candidate Evaluator 240 begins at the highest level of the schema, and iteratively and/or recursively analyzes subsequently deeper levels. In such an embodiment, the Candidate Evaluator 240 begins the analysis with the "device" node in the Provisioning Program Schema 215. As discussed above, the corresponding constraint for the "device" node in the schema is an equality constraint, that forces the remaining candidates to have a value equal to the value(s) found in the Configuration Tree 115. Based on the illustrated Configuration Tree 115, which includes three distinct values for "device," the Candidate Evaluator 240 can generate three candidates:

{device="X"}, {device="Y"}, and {device="Z"}. Stated differently, in one embodiment, an initial candidate can be imagined that includes all nodes in the configuration (e.g., with no defined input values). Because the first constraint is an equality constraint that forces the candidate(s) to take a value equal to the value(s) in the configuration, application of this constraint splits the initial candidate into three candidates: one for each identified value. These candidates then collectively cover the entire Configuration Tree 115 (because no candidates have yet been eliminated).

Thus, at this first level, three candidates are generated, and each remains "valid." The analysis then continues for the next schema node. In an embodiment, the Candidate Evaluator 240 then selects a child node of the "device" node in the schema (e.g., the "flagA" node), and identifies the corresponding constraint. In the illustrated embodiment, this constraint is a constant constraint. In one embodiment, the constant constraint does not modify the candidates (e.g., by taking the value specified in the Configuration Tree 115), but forces them to have the defined constant value. All candidates covering nodes that do not have this value are eliminated. In another embodiment, the constant constraint narrows the candidate by adding the specified value to the candidate's definition. In the illustrated embodiment, the candidates {device="Y"} and {device="Z"}, which correspond to the devices Y and Z in the Configuration Tree 115, satisfy this constraint, and are thus considered "constrained" and remain valid. In contrast, the candidate {device="X"}, corresponding to the device X, fails, because the corresponding value in the Configuration Tree 115 for the flagA node belonging to the device X is "2."

Thus, in an embodiment, the Candidate Evaluator 240 can determine that the first candidate, {device="X"}, is invalid, as is the corresponding branch of the Configuration Tree 115. In one embodiment, the candidate is thus removed from further processing. In some embodiments, this candidate is flagged for review by a human, or for other additional processing.

Continuing with the illustrated example, the Candidate Evaluator 240 may then turn to the next node in the Provisioning Program Schema 215: the "interface" node. As discussed above, the corresponding constraint for this schema node is another equality constraint, that narrows each remaining candidate based on the value(s) found in the Configuration Tree 115. In the illustrated embodiment, for the {device="Y"}, candidate, the Candidate Evaluator 240 identifies a value of "If0," and thus constraints or narrows the candidate to be {device="Y"; interface="If0"}. For the candidate {device="Z"}, the constraint does not unambiguously apply. That is, because the Configuration Tree 115 includes two interface nodes with differing values for the interface schema node for the candidate {device="Y"}, the Candidate Evaluator 240 splits this candidate into two new ones: {device="Y"; interface="If0"} and {device="Y"; interface="If1"}.

Continuing to the "description" schema node, the Candidate Evaluator 240 once again identifies the corresponding constraint, which is another equality constraint that requires the candidates to have a string matching the one found in the Configuration Tree 115. As a reminder, based on the Service Provisioning Program 110, this constraint further requires that the string value in the configuration node is "Interface for", followed by the "device" listed in the candidate. If the string does not match, the candidate is eliminated. In the illustrated embodiment, the candidate {device="Y"; interface="If0"} thus fails, and is eliminated. That is, the candidate specifies {device="Y"}, and the description node specifies {description="Interface for X"}. Because this fails the constraint, the candidate is eliminated and/or flagged for further review.

Similarly, the candidate {device="Z"; interface="If1"} fails, because the corresponding string does not match the requirements imposed by the Service Provisioning Program 110. In contrast, the candidate {device="Z"; interface="If0"} satisfies this constraint, and remains valid. Because there are no remaining schema nodes to be evaluated, the Candidate Evaluator 240 can thereby label this candidate as valid, and absorb the corresponding input into the automated provisioning system.

Figure 4:
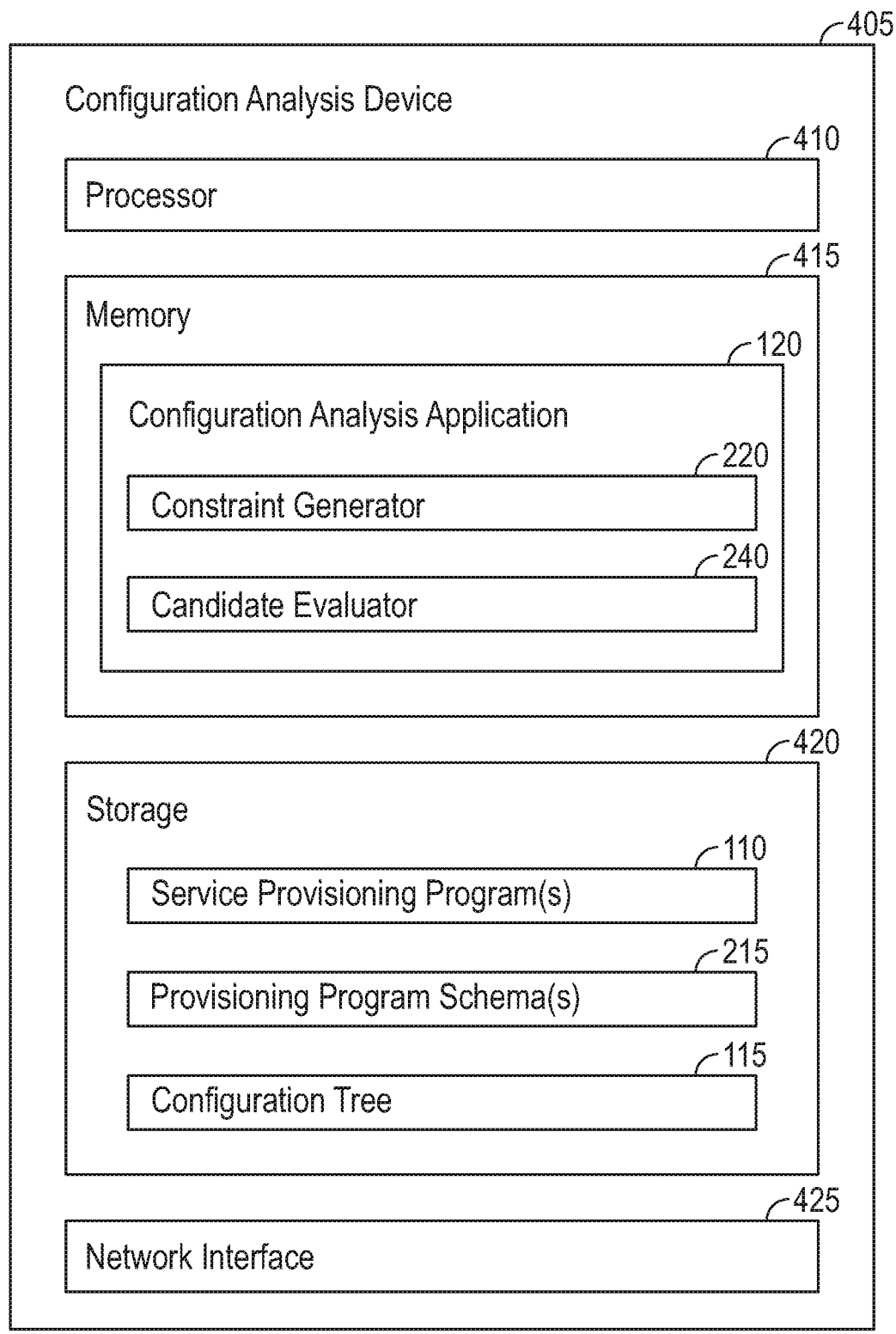
FIG. 4 is a block diagram illustrating a configuration analysis device configured to automatically identify manual intents in a network, according to one embodiment disclosed herein.

FIG. 4 is a block diagram illustrating a Configuration Analysis Device 405 configured to automatically identify manual intents in a network, according to one embodiment disclosed herein. As illustrated, the Configuration Analysis Device 405 includes a Processor 410, a Memory 415, Storage 420, and a Network Interface 425. In the illustrated embodiment, Processor 410 retrieves and executes programming instructions stored in Memory 415 as well as stores and retrieves application data residing in Storage 420. Processor 410 is representative of a single CPU, multiple CPUs, a single CPU having multiple processing cores, and the like. Memory 415 is generally included to be representative of a random access memory. Storage 420 may be a disk drive or flash-based storage device, and may include fixed and/or removable storage devices, such as fixed disk drives, removable memory cards, or optical storage, network attached storage (NAS), or storage area network (SAN). Via the Network Interface 425, the Configuration Analysis Device 405 can be communicatively coupled with one or more other devices including devices used by administrators, network devices, and the like.

In the illustrated embodiment, the Storage 420 includes source code for one or more Service Provisioning Programs 110, corresponding Provisioning Program Schema(s) 215 for one or more of the Service Provisioning Programs 110, and a Configuration Tree 115. Although illustrated as residing in Storage 420, in embodiments, the Service Provisioning Program(s) 110, Provisioning Program Schema(s) 215, and Configuration Tree 115 may reside in any suitable location. In embodiments, the Service Provisioning Program(s) 110 are software used by network administrators to configure and modify the configuration of a network. In one embodiment, the Service Provisioning Program(s) 110 are used to configure a software-defined network (SDN), such as by creating and modifying physical and virtual devices, ports, interfaces, forwarding tables, and the like. Generally, the Service Provisioning Program(s) 110 are configured to receive user input (such as a name for an interface, or the endpoints of a connection), and modify the configuration of the network based on this input (e.g., by creating a new interface or establishing a connection).

In embodiments, there may be any number of Service Provisioning Programs 110 used to configure the network and provision services and resources. In an embodiment, in order to analyze the Configuration Tree 115, the user can provide the Configuration Analysis Application 120 with access to the Service Provisioning Program(s) 110 and/or their source code. In the illustrated embodiment, each Provisioning Program Schema 215 indicates the structure of the corresponding Service Provisioning Program 110 (e.g., objects, data types, and the like). In an embodiment, each node in a given Provisioning Program Schema 215 can have zero or more instances in the Configuration Tree 115. That is, a given schema node (such as an "interface" node) may or may not be found in the actual configuration, and may have multiple instances in the configuration. In an embodiment, each corresponding configuration node(s) for a given schema node may be associated with one or more particular values (such as a name, description, and the like).

In one embodiment, there is a Provisioning Program Schema 215 for each relevant Service Provisioning Program 110. In some embodiments, one or more of the Service Provisioning Programs 110 may not be associated with a defined schema. In one embodiment, a user or administrator can define the schema based on the code. In another embodiment, the Configuration Analysis Application 120 can analyze the code and/or the configuration to infer the schema. In the illustrated embodiment, the Configuration Tree 115 is a tree structure that represents the current configuration of a given network, at a given moment in time. In one embodiment, the Configuration Tree 115 includes every element of the network configuration that is of interest to the automated system. In some embodiments, for each configuration node in the Configuration Tree 115, there is a corresponding schema node in one or more of the Provisioning Program Schema(s) 215. In another embodiment, if a configuration node is not found in any of the relevant schemas, the Configuration Analysis Application 120 can determine that the configuration node is "invalid" or otherwise unexplained. That is, the node cannot have been created using the available Service Provisioning Program(s) 110. In such a case, the node was either manually created or modified without such software, or there is at least one Service Provisioning Program 110 that the Configuration Analysis Application 120 is not aware of.

In the illustrated embodiment, the Memory 415 includes a Configuration Analysis Application 120. Although illustrated as software residing in memory, in embodiments, the functionality of the Configuration Analysis Application 120 can be implemented using hardware, software, or a combination of hardware and software. As illustrated, the Configuration Analysis Application 120 includes a Constraint Generator 220 and a Candidate Evaluator 240. Although depicted as discrete components for illustration, in embodiments, the operations of the Constraint Generator 220 and Candidate Evaluator 240 may be combined or divided across any number of components. In an embodiment, the Constraint Generator 220 analyzes Service Provisioning Program(s) 110 and/or Provisioning Program Schema(s) 215 to determine relevant constraints on the Configuration Tree 115. For example, these constraints may include that a given node must have a particular value. Of course, in practice, the constraints are likely to be significantly more complex.

In an embodiment, the Candidate Evaluator 240 iteratively and recursively generates candidates, applies the constraints to each candidate, and eliminates or modifies the candidate based on the result of this analysis. Once each relevant constraint has been applied, the Candidate Evaluator 240 can determine if any candidates remain. If so, these are valid candidates that reflect legitimate configurations in the network. In one embodiment, each candidate corresponds to a particular node and/or branch in the Configuration Tree 115. In some embodiments, each candidate includes a set of input values that can be applied to one or more Service Provisioning Program(s) 110 to create the corresponding node(s) and/or branch(es) in the Configuration Tree 115. In one embodiment, the candidates/nodes that are eliminated (e.g., determined to be invalid) correspond to node(s) and/or branch(es) in the Configuration Tree 115 that were not created using the Service Provisioning Program(s) 110 (or were modified without use of the programs).

Figure 5:
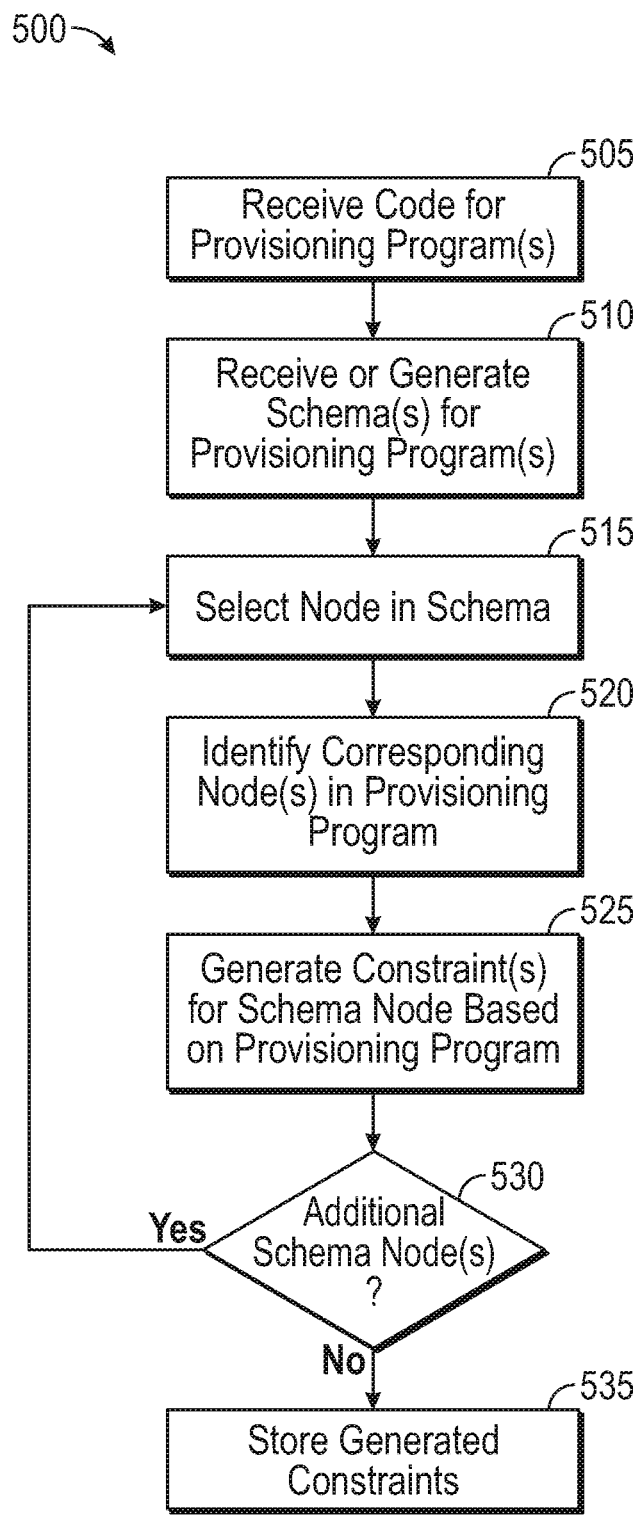
FIG. 5 is a flow diagram illustrating a method of analyzing service provisioning programs and schemas to generate constraints on validly-configured network configurations, according to one embodiment disclosed herein.

FIG. 5 is a flow diagram illustrating a method 500 of analyzing service provisioning programs and schemas to generate constraints on validly-configured network configuration nodes, according to one embodiment disclosed herein. In the illustrated embodiment, the method 500 begins at block 505, where a Constraint Generator 220 receives code for one or more resource provisioning programs used to configure a network. At block 510, the Constraint Generator 220 similarly receives (or generates) one or more schemas for each of the one or more provisioning programs. The method 500 then proceeds to block 515, where the Constraint Generator 220 selects a schema node in the received schema(s). The method 500 then continues to block 520.

At block 520, the Constraint Generator 220 identifies the corresponding program node(s) in the received provisioning program(s). In one embodiment, identifying the corresponding program nodes includes identifying any portions of the program that can modify or establish a value for the schema node. For example, for a "device" node, the corresponding program section would be any portions of the program that create or modify "devices." Similarly, for an "interface" schema node, the Constraint Generator 220 identifies sections of the program that create or modify "interfaces." The method 500 then proceeds to block 525, where the Constraint Generator 220 generates one or more constraint(s) that are applicable to the selected schema node, based on the identified program portions.

For example, if the program specifies that a value for a particular flag is always a constant value, the Constraint Generator 220 can generate a constraint forcing this value. In various embodiments, there may be any number of constraints generated for a particular schema node. In embodiments, these constraints can include, for example, equality constraints, constant constraints, and the like. Another example of a constraint is an inequality constraint that forces the candidate(s) to have a value that is not equal to the one specified in the constraint. Similarly, in some embodiments, comparator constraints can be utilized (e.g., greater than, greater than or equal to, less than, less than or equal to). In one embodiment, applying a "greater than" constraint can cause each candidate to be split into two candidates: one where the value is "greater than" the specified value, and the other where the value is "less than or equal to" the specified value. In embodiments, the constraints can include any programmatic requirement (such that a value be prime, such that a particular character in a string must match the defined value, and the like). The method 500 then continues to block 530, where the Constraint Generator 220 determines whether there is at least one additional schema node to be analyzed. If so, the method 500 returns to block 515. Otherwise, the method 500 terminates at block 535, where the generated constraints are stored for subsequent use.

Figure 6:
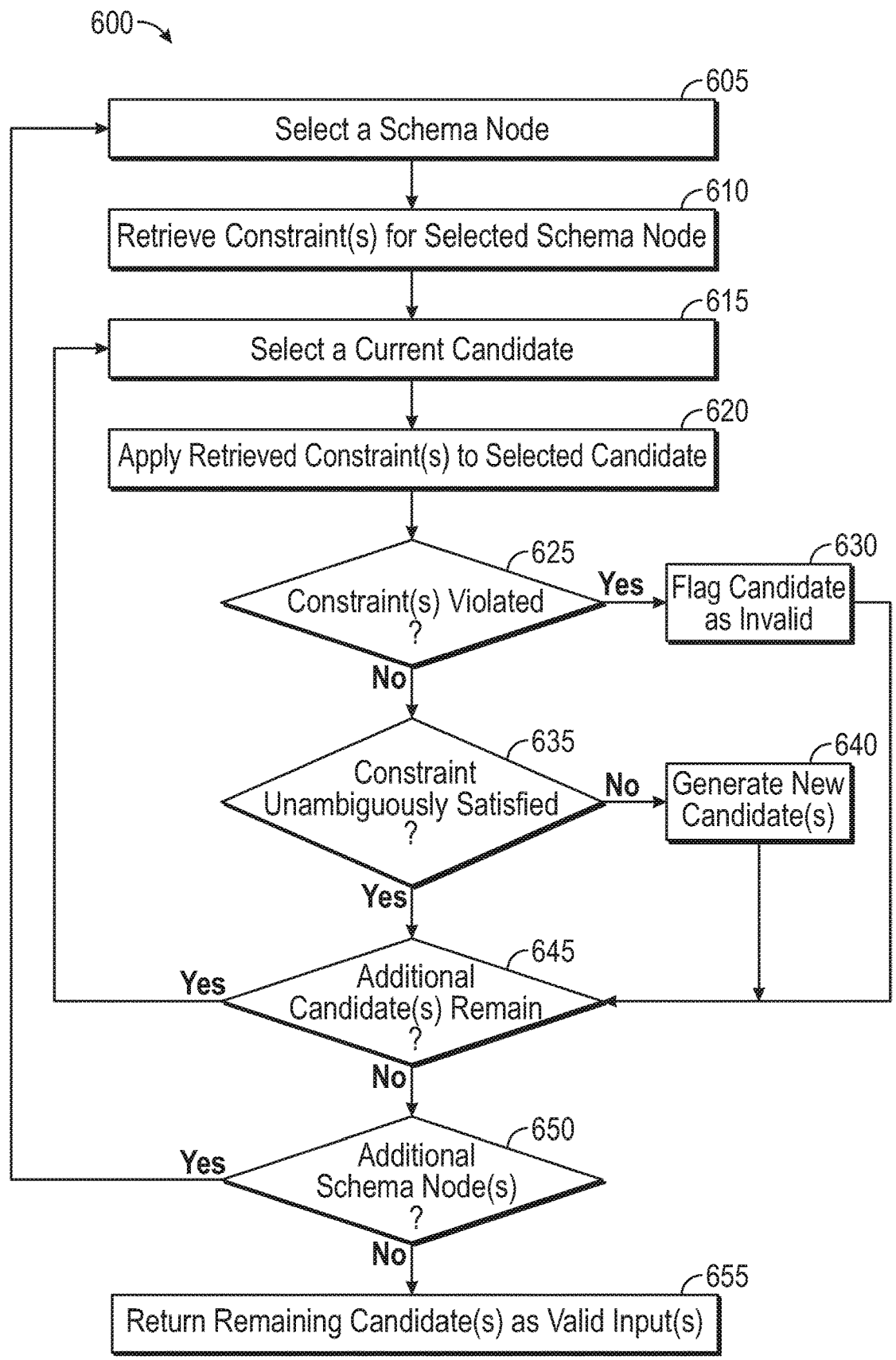
FIG. 6 is a flow diagram illustrating a method of automatically identifying manually-configured intents in a network configuration, according to one embodiment disclosed herein.

FIG. 6 is a flow diagram illustrating a method 600 of automatically identifying manually-configured intents in a network configuration, according to one embodiment disclosed herein. In one embodiment, the method 600 utilizes the constraints generated by the Constraint Generator 220 (e.g., using the method 500) to iteratively and recursively evaluate the Configuration Tree 115. The method 600 begins at block 605, where a Candidate Evaluator 240 selects a schema node for analysis. As discussed above, in one embodiment, the Candidate Evaluator 240 begins at the highest-level node (e.g., the "device" node) in the schema, and recursively iterates through subsequent levels of the schema until all nodes have been considered.

At block 610, the Candidate Evaluator 240 retrieves the constraint(s) that are applicable to the selected schema node. The method 600 then proceeds to block 615, where the Candidate Evaluator 240 selects one of the candidates that are currently considered valid. In one embodiment, the Candidate Evaluator 240 generates the initial set of candidates by identifying the relevant configuration node(s) for the top-level schema node, and generates a candidate for each such configuration node (or for each unique value in the configuration nodes). In another embodiment, the Candidate Evaluator 240 initially uses a generic candidate that covers the entire configuration tree, and applies the initial constraint(s) to determine whether it should be constrained or otherwise modified. For example, if the top-level schema node is "device," the Candidate Evaluator 240 may first use a candidate corresponding to {device="*"}, where * is a wild card, indicating that the candidate covers all device nodes in the configuration. Application of an equality constraint, as discussed above, would then split this candidate into a number of candidates equal to the number of unique values for "device" found in the configuration.

At block 620, the Candidate Evaluator 240 applies the relevant constraint(s) to the selected candidate. In an embodiment, applying the constraint can differ depending on what the underlying constraint is and/or the current contents of the candidate. For example, a "constant" constraint can enforce a constant value for that node in the configuration tree, such that candidates that cover nodes with different values are eliminated. As another example, suppose a constraint requires a parameter P be less than five. If a candidate does not yet have a value for P, the Candidate Evaluator 240 can simply record that P<5 in the candidate. Suppose instead that the candidate includes P=1 (e.g., because of a previously-evaluated constraint). In an embodiment, this candidate can remain unchanged because it already satisfies the constraint (and is more specific than the constraint). Alternatively, if the candidate includes P=10, this candidate is eliminated because it is incompatible with the constraint.

Additionally, in embodiments, there may be multiple constraints for a given parameter. For example, in addition to P<5, there may also be a P>2 constraint, which further narrows the allowable candidates to ones where 2<P<5. In this manner, the candidates continue to accumulate information as they are processed. Note that in some embodiments, there is no guarantee for unambiguous results. In practice, however, unambiguous results can be typically expected because actual configurations are being processed (as opposed to hypothetical corner-cases), and because simpler constraints like equality are extremely common. Returning to FIG. 3 as an example, suppose the currently selected candidate is {device="X"}. In the illustrated embodiment, this candidate covers the "device X" node in the Configuration Tree 115, and all child nodes for that device node. Thus, when applying the constant constraint (indicating that flagA must be "1"), the Candidate Evaluator 240 will determine that the candidate {device="X"} fails this constraint, because its corresponding flagA node has an incorrect value.

Continuing to block 625, if the Candidate Evaluator 240 determines that the constraint(s) are violated, the method 600 proceeds to block 630, where the candidate is removed and flagged as invalid. Continuing the above example, the candidate {device="X"} is eliminated, and the corresponding portion of the Configuration Tree 115 (the "device X" block, as well as its child elements) are removed from further consideration. In some embodiments, these eliminated configuration nodes are flagged for review by a human or other algorithm. For example, a human may need to review internal documentation or other available data to determine why that portion of the network was configured in a way that conflicts with the resource provisioning code. In some embodiments, the system utilizes fuzzy matching and machine learning techniques to identify configurations that appear to be mistakes. For example, if a device has hundreds of parameters that are set according to the template and one that is not compatible, this one node may be due to a mistake by a human. The method 600 then continues to block 645.

Returning to block 625, if the Candidate Evaluator 240 determines that the constraint(s) are not violated, the method 600 proceeds to block 635, where the Candidate Evaluator 240 determines whether the constraint(s) were unambiguously satisfied. For example, returning to the example discussed in relation to FIG. 3, for the candidate {device="Z"}, the candidate does not unambiguously satisfy the equality constraint relevant to the "interface" schema node. As discussed above, in an embodiment, the equality constraint forces the candidate to take the value(s) specified in the configuration node(s) that are included in the candidate. Thus, for the candidate {device="Z"}, this constraint would force the candidate to be narrowed to include {interface="If0"}, as well as {interface=If1"}. Because there are two valid options, however, the candidate {device="Z"} ambiguously satisfies the constraint, but does not unambiguously do so.

At block 635, if the Candidate Evaluator 240 determines that the constraint is ambiguously satisfied, the method 600 proceeds to block 640, where the Candidate Evaluator 240 splits the selected candidate into the valid options. In this example, the candidate {device="Z"} is split into {device="Z"; interface="If0"}, and {device="Z"; interface="If1"}. The method 600 then proceeds to block 645. Returning to block 635, if the constraint is unambiguously satisfied, the method 600 also continues to block 645.

At block 645, the Candidate Evaluator 240 determines whether there is at least one additional candidate that has not yet had the current constraints applied. If so, the method 600 returns to block 615 to iteratively consider each candidate. If no such candidates remain to be analyzed, the method 600 proceeds to block 650. At block 650, the Candidate Evaluator 240 determines whether there is at least one additional schema node that has not yet been applied or considered. If so, the method 600 returns to block 605. In this way, the Candidate Evaluator 240 recursively analyzes each schema node, beginning at the highest level and proceeding towards the leaves of the schema tree.

If no such schema nodes remain, the method 600 terminates at block 655, where the Candidate Evaluator 240 marks any remaining candidates as valid. That is, if any candidates remain that have not yet been eliminated, and there are no additional constraints that must be applied, the remaining candidates represent portions of the Configuration Tree 115 that were "validly" configured using the resource provisioning software. In an embodiment, each remaining candidate indicates the input(s) that yield these nodes. For example, returning to the example discussed in relation to FIG. 3, the candidate {device="Z"; interface="If0"} is valid, and indicates that the corresponding inputs for "device" and "interface" yield a configuration that is found in the Configuration Tree 115. In an embodiment, these valid inputs can be ingested into the automated system, such that the system can automatically implement this configuration. However, in an embodiment, "invalid"

configurations cannot be included in the automated system, because it is unclear why or how they were created.

Figure 7:
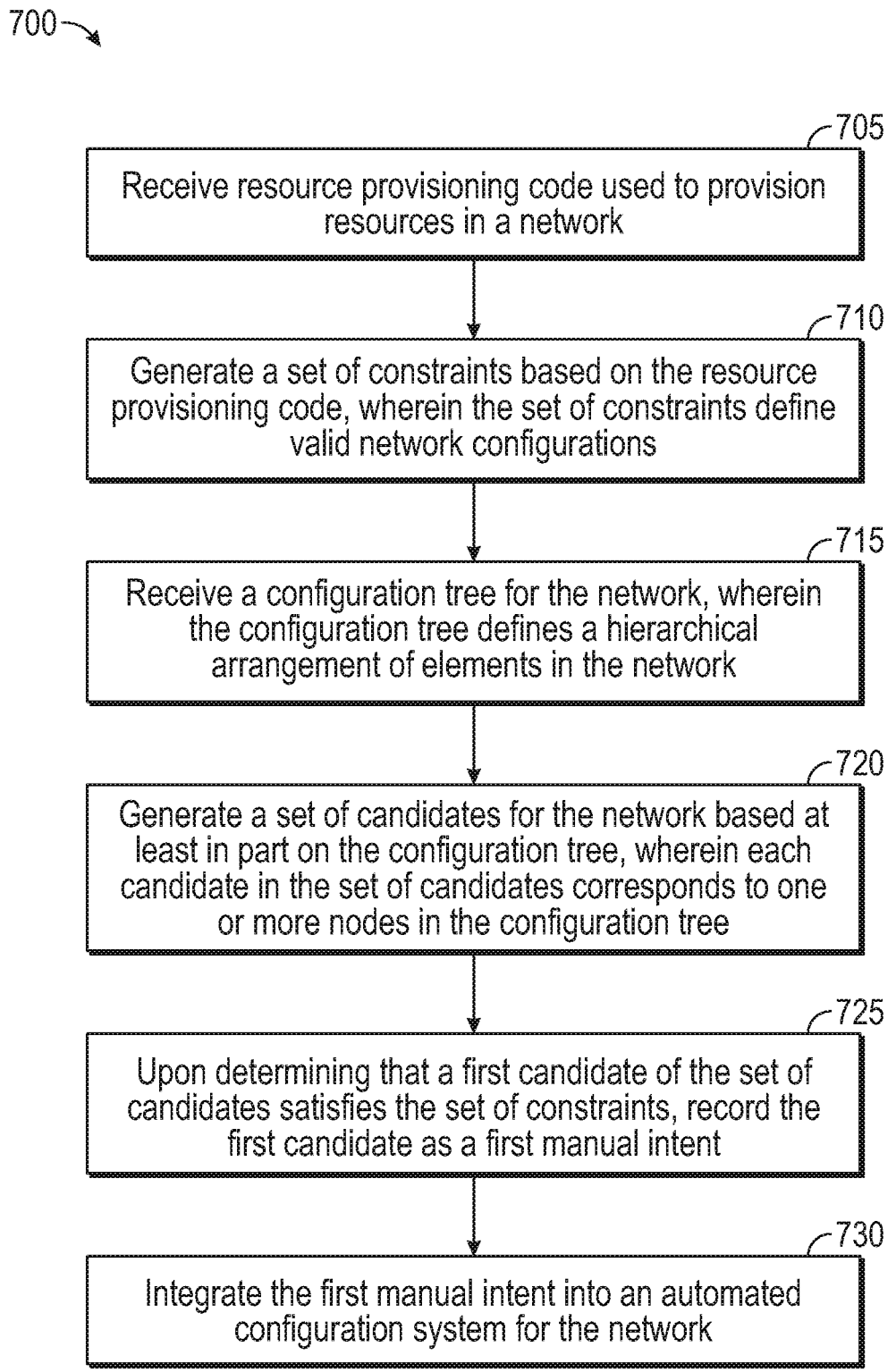
FIG. 7 is a flow diagram illustrating a method of automatically identifying and ingesting manual intent into an automated configuration system, according to one embodiment disclosed herein.

FIG. 7 is a flow diagram illustrating a method 700 of automatically identifying and ingesting manual intent into an automated configuration system, according to one embodiment disclosed herein. The method 700 begins at block 705, where a Configuration Analysis Application 120 receives resource provisioning code used to provision resources in a network. The method 700 then proceeds to block 710, where the Configuration Analysis Application 120 generates a set of constraints based on the resource provisioning code, wherein the set of constraints define valid network configurations. At block 715, the Configuration Analysis Application 120 receives a configuration tree for the network, wherein the configuration tree defines a hierarchical arrangement of configuration elements in the network. Additionally, at block 720, the Configuration Analysis Application 120 generates a set of candidates for the network based at least in part on the configuration tree, wherein each candidate in the set of candidates corresponds to one or more nodes in the configuration tree. At block 725, upon determining that a first candidate of the set of candidates satisfies the set of constraints, the Configuration Analysis Application 120 records the first candidate as a first manual intent. Finally, the method 700 proceeds to block 730, where the Configuration Analysis Application 120 integrates the first manual intent into an automated configuration system for the network.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method comprising:
receiving resource provisioning code, wherein the resource provisioning code is software used to provision and configure resources in a network;
generating a set of constraints by evaluating the resource provisioning code, wherein the set of constraints define valid network configurations that can be implemented using the resource provisioning code;
receiving a configuration tree for the network, wherein the configuration tree defines a hierarchical arrangement of configuration elements in the network and includes one or more valid nodes that were generated using the resource provisioning code and one or more invalid nodes that were not generated using the resource provisioning code;
generating a set of candidates for the network based at least in part on the configuration tree, wherein each candidate in the set of candidates corresponds to one or more nodes in the configuration tree; and
upon determining, by operation of one or more computer processors, that a first candidate of the set of candidates satisfies the set of constraints, recording the first candidate as a first manual intent; and
integrating the first manual intent into an automated configuration system for the network.

2. The method of claim 1, wherein each respective candidate in the set of candidates comprises a respective set of one or more inputs for the resource provisioning code, wherein the respective set of one or more inputs, when provided to the resource provisioning code, cause the resource provisioning code to output a respective configuration corresponding to the respective candidate.

3. The method of claim 1, the method further comprising:
upon determining that a second candidate of the set of candidates fails at least one constraint in the set of constraints, flagging the second candidate for manual review.

4. The method of claim 1, the method further comprising:
upon determining that a second candidate has multiple sets of inputs that could be used to satisfy a first constraint of the set of constraints, splitting the second candidate into at least two new candidates.

5. The method of claim 1, the method further comprising:
receiving a schema associated with the resource provisioning code, wherein each node in the schema has zero or more instances in the configuration tree, and wherein each node in the configuration tree corresponds to at least one node in the schema.

6. The method of claim 1, the method further comprising:
recursively applying one or more constraints from the set of constraints to each node in the configuration tree, in order to identify nodes in the configuration tree that correspond to manual user intent.

7. The method of claim 1, wherein generating the set of constraints comprises determining, based on the resource provisioning code, a set of valid nodes for the network, wherein each node in the set of valid nodes corresponds to a configuration node that can be generated using the resource provisioning code.

8. A non-transitory computer-readable storage medium having computer-readable program code embodied therewith, the computer-readable program code executable by one or more computer processors to perform an operation comprising:
receiving resource provisioning code, wherein the resource provisioning code is software used to provision and configure resources in a network;
generating a set of constraints by evaluating the resource provisioning code, wherein the set of constraints define valid network configurations that can be implemented using the resource provisioning code;
receiving a configuration tree for the network, wherein the configuration tree defines a hierarchical arrangement of configuration elements in the network and includes one or more valid nodes that were generated using the resource provisioning code and one or more invalid nodes that were not generated using the resource provisioning code;
generating a set of candidates for the network based at least in part on the configuration tree, wherein each candidate in the set of candidates corresponds to one or more nodes in the configuration tree; and
upon determining that a first candidate of the set of candidates satisfies the set of constraints, recording the first candidate as a first manual intent; and
integrating the first manual intent into an automated configuration system for the network.

9. The non-transitory computer-readable storage medium of claim 8, wherein each respective candidate in the set of candidates comprises a respective set of one or more inputs for the resource provisioning code, wherein the respective set of one or more inputs, when provided to the resource provisioning code, cause the resource provisioning code to output a respective configuration corresponding to the respective candidate.

10. The non-transitory computer-readable storage medium of claim 8, the operation further comprising:
upon determining that a second candidate of the set of candidates fails at least one constraint in the set of constraints, flagging the second candidate for manual review.

11. The non-transitory computer-readable storage medium of claim 8, the operation further comprising:
upon determining that a second candidate has multiple sets of inputs that could be used to satisfy a first constraint of the set of constraints, splitting the second candidate into at least two new candidates.

12. The non-transitory computer-readable storage medium of claim 8, the operation further comprising:
receiving a schema associated with the resource provisioning code, wherein each node in the schema has zero or more instances in the configuration tree, and wherein each node in the configuration tree corresponds to at least one node in the schema.

13. The non-transitory computer-readable storage medium of claim 8, the operation further comprising:
recursively applying one or more constraints from the set of constraints to each node in the configuration tree, in order to identify nodes in the configuration tree that correspond to manual user intent.

14. The non-transitory computer-readable storage medium of claim 8, wherein generating the set of constraints comprises determining, based on the resource provisioning code, a set of valid nodes for the network, wherein each node in the set of valid nodes corresponds to a configuration node that can be generated using the resource provisioning code.

15. A system comprising:
one or more computer processors; and
a memory containing a program which when executed by the one or more computer processors performs an operation, the operation comprising:
receiving resource provisioning code, wherein the resource provisioning code is software used to provision and configure resources in a network;
generating a set of constraints by evaluating the resource provisioning code, wherein the set of constraints define valid network configurations that can be implemented using the resource provisioning code;
receiving a configuration tree for the network, wherein the configuration tree defines a hierarchical arrangement of configuration elements in the network and includes one or more valid nodes that were generated using the resource provisioning code and one or more invalid nodes that were not generated using the resource provisioning code;
generating a set of candidates for the network based at least in part on the configuration tree, wherein each candidate in the set of candidates corresponds to one or more nodes in the configuration tree; and
upon determining that a first candidate of the set of candidates satisfies the set of constraints, recording the first candidate as a first manual intent; and
integrating the first manual intent into an automated configuration system for the network.

16. The system of claim 15, wherein each respective candidate in the set of candidates comprises a respective set of one or more inputs for the resource provisioning code, wherein the respective set of one or more inputs, when provided to the resource provisioning code, cause the resource provisioning code to output a respective configuration corresponding to the respective candidate.

17. The system of claim 15, the operation further comprising:
upon determining that a second candidate of the set of candidates fails at least one constraint in the set of constraints, flagging the second candidate for manual review.

18. The system of claim 15, the operation further comprising:
upon determining that a second candidate has multiple sets of inputs that could be used to satisfy a first constraint of the set of constraints, splitting the second candidate into at least two new candidates.

19. The system of claim 15, the operation further comprising:
receiving a schema associated with the resource provisioning code, wherein each node in the schema has zero or more instances in the configuration tree, and wherein each node in the configuration tree corresponds to at least one node in the schema.

20. The system of claim 15, wherein generating the set of constraints comprises determining, based on the resource provisioning code, a set of valid nodes for the network, wherein each node in the set of valid nodes corresponds to a configuration node that can be generated using the resource provisioning code.

* * * * *